United States Patent
Gupte et al.

(10) Patent No.: US 10,677,679 B2
(45) Date of Patent: Jun. 9, 2020

(54) REFRIGERANT LEAK DETECTION AND MANAGEMENT BASED ON CONDENSATION FROM AIR SAMPLES

(71) Applicant: Johnson Controls Technology Company, Auburn Hills, MI (US)

(72) Inventors: Neelkanth Gupte, Katy, TX (US); William F. McQuade, New Cumberland, PA (US)

(73) Assignee: Johnson Controls Technology Company, Auburn Hills, MI (US)

( * ) Notice: Subject to any disclaimer, the term of this patent is extended or adjusted under 35 U.S.C. 154(b) by 172 days.

(21) Appl. No.: 15/871,694

(22) Filed: Jan. 15, 2018

(65) Prior Publication Data
US 2019/0170602 A1 Jun. 6, 2019

Related U.S. Application Data

(60) Provisional application No. 62/593,613, filed on Dec. 1, 2017.

(51) Int. Cl.
| | |
|---|---|
| *F24F 11/02* | (2006.01) |
| *G01M 3/18* | (2006.01) |
| *F25B 49/00* | (2006.01) |
| *G01M 3/40* | (2006.01) |
| *F24F 11/36* | (2018.01) |
| *G01M 3/32* | (2006.01) |

(52) U.S. Cl.
CPC .............. *G01M 3/18* (2013.01); *F24F 11/36* (2018.01); *F25B 49/005* (2013.01); *G01M 3/3236* (2013.01); *G01M 3/40* (2013.01); *F25B 2500/222* (2013.01)

(58) Field of Classification Search
CPC . F24F 11/36; F25B 2500/22; F25B 2500/222; G01M 3/18
See application file for complete search history.

(56) References Cited

U.S. PATENT DOCUMENTS

| | | | |
|---|---|---|---|
| 7,151,264 B2 | 12/2006 | Ehlers, Sr. | |
| 9,163,865 B2 | 10/2015 | Wakamoto et al. | |
| 9,677,799 B2* | 6/2017 | Ochiai | F25B 49/005 |
| 2007/0193285 A1* | 8/2007 | Knight | F25B 43/04 |
| | | | 62/126 |
| 2013/0213068 A1 | 8/2013 | Goel et al. | |
| 2015/0362204 A1 | 12/2015 | Goel et al. | |
| 2016/0178229 A1 | 6/2016 | Chen et al. | |

FOREIGN PATENT DOCUMENTS

EP  1083392  5/2007

* cited by examiner

*Primary Examiner* — Jonathan Bradford
(74) *Attorney, Agent, or Firm* — Fletcher Yoder, P.C.

(57) ABSTRACT

A refrigerant leak detection system for a heating, ventilation, and air conditioning (HVAC) system includes a vessel configured to receive an air sample. The refrigerant leak detection system includes a cooling device configured to cool the vessel and a liquid detection device configured to detect liquid in the vessel. The refrigerant leak detection system further includes an actuator configured to actuate a transfer mechanism to collect the air sample in the vessel.

30 Claims, 9 Drawing Sheets

REFRIGERANT LEAK DETECTION AND MANAGEMENT BASED ON CONDENSATION FROM AIR SAMPLES

CROSS-REFERENCE TO RELATED APPLICATION

This application is a Non-Provisional Applications claiming priority to U.S. Provisional Application No. 62/593,613, entitled "REFRIGERANT LEAK DETECTION AND MANAGEMENT BASED ON CONDENSATION FROM AIR SAMPLES," filed Dec. 1, 2017, which is hereby incorporated by reference in its entirety for all purposes.

BACKGROUND

The present disclosure relates generally to heating, ventilating, and air conditioning (HVAC) systems, and more particularly to refrigerant leak detection and management for HVAC systems.

Residential, light commercial, commercial, and industrial HVAC systems are used to control temperatures and air quality in residences and buildings. Generally, the HVAC systems may circulate a refrigerant through a closed refrigeration circuit between an evaporator, where the refrigerant absorbs heat, and a condenser, where the refrigerant releases heat. The refrigerant flowing within the refrigerant circuit is generally formulated to undergo phase changes within the normal operating temperatures and pressures of the system so that quantities of heat can be exchanged by virtue of the latent heat of vaporization of the refrigerant. As such, the refrigerant flowing within a HVAC system travels through multiple conduits and components of the refrigerant circuit. Inasmuch as refrigerant leaks compromise system performance or result in increased costs, it is accordingly desirable to provide detection and response systems and methods for the HVAC system to reliably detect and respond to any refrigerant leaks of the HVAC system.

SUMMARY

In one embodiment of the present disclosure, a refrigerant leak detection system for a heating, ventilation, and air conditioning (HVAC) system includes a vessel configured to receive an air sample. The refrigerant leak detection system also includes a cooling device configured to cool the vessel and a liquid detection device configured to detect liquid in the vessel. The refrigerant leak detection system further includes an actuator configured to actuate a transfer mechanism to collect the air sample in the vessel.

In another embodiment of the present disclosure, a heating, ventilation, and air conditioning (HVAC) system includes a sensor that includes a vessel, a compression assembly, a cooling device, and a liquid detection device. The HVAC system also includes a controller configured to instruct the sensor to collect an air sample in the vessel from a monitored air volume of the HVAC system, instruct the compression assembly to compress the air sample to a predefined pressure threshold, instruct the cooling device to cool the air sample to a predefined temperature threshold, instruct the liquid detection device to identify whether a condensed refrigerant is present in the vessel, and instruct the HVAC system to modify operation when the condensed refrigerant is present in the vessel.

In a further embodiment of the present disclosure, a method of operating a sensor system of a heating, ventilation, and air conditioning (HVAC) system of a building includes collecting an air sample in a vessel of the sensor system from a monitored air volume of the HVAC system or the building. The method includes compressing and cooling the air sample within the vessel. Further, the method includes determining whether any condensed refrigerant is present in the vessel.

Other features and advantages of the present application will be apparent from the following, more detailed description of the embodiments, taken in conjunction with the accompanying drawings which illustrate, by way of example, the principles of the application.

DETAILED DESCRIPTION

The present disclosure is directed to refrigerant leak detection and management for HVAC systems. As discussed above, to condition the interior space of a building, a HVAC system generally includes refrigerant flowing within a refrigeration circuit. However, the refrigerant may inadvertently leak from a flow path of the refrigeration circuit due to wear or degradation to components, or imperfect joints or connections within the refrigeration circuit at some point after installation. Under certain conditions, leaking refrigerant vaporizes and distributes outward from a source of the leak, which can result in refrigerant-containing air accumulating, for example, within a casing of a HVAC unit, within the ductwork of the building, and/or within the conditioned interior space of the building.

With the foregoing in mind, present embodiments are directed to a leak detection system of a HVAC system. The disclosed leak detection system includes one or more refrigerant sensors positioned at suitable sensing locations within the HVAC system and/or the building conditioned by the HVAC system to detect refrigerant that has leaked from the refrigeration circuit of the HVAC system. The disclosed refrigerant sensors, which may also be referred to as refrigerant sensor systems, generally determine whether a refrigerant leak has occurred by collecting an air sample from a monitored air volume, cooling the air sample to a suitable temperature, and detecting liquid refrigerant that condenses from leaked refrigerant vapor present in the air sample. Additionally, the refrigerant sensor can compress the air sample to increase the dew point of the refrigerant, thereby reducing an amount or degree of cooling used to condense the refrigerant from the air sample. In certain embodiments, the refrigerant sensor may also be designed and configured to remove other potential condensable components, such as water, from in the air sample, enabling the refrigerant sensor to selectively condense refrigerant. By analyzing liquid condensed from the air sample, the refrigerant sensor can determine whether a refrigerant leak is present. Further, the refrigerant sensor is communicatively coupled to a suitable controller, such as a HVAC controller, to provide signals to the controller indicative of the refrigerant leak, and the controller can modify operation of the HVAC system in response to these signals. In this manner, the disclosed techniques enable detection of refrigerant leaks within the HVAC system, and enable response via any combination of suitable control actions to address and manage the leaked refrigerant.

Figure 1:
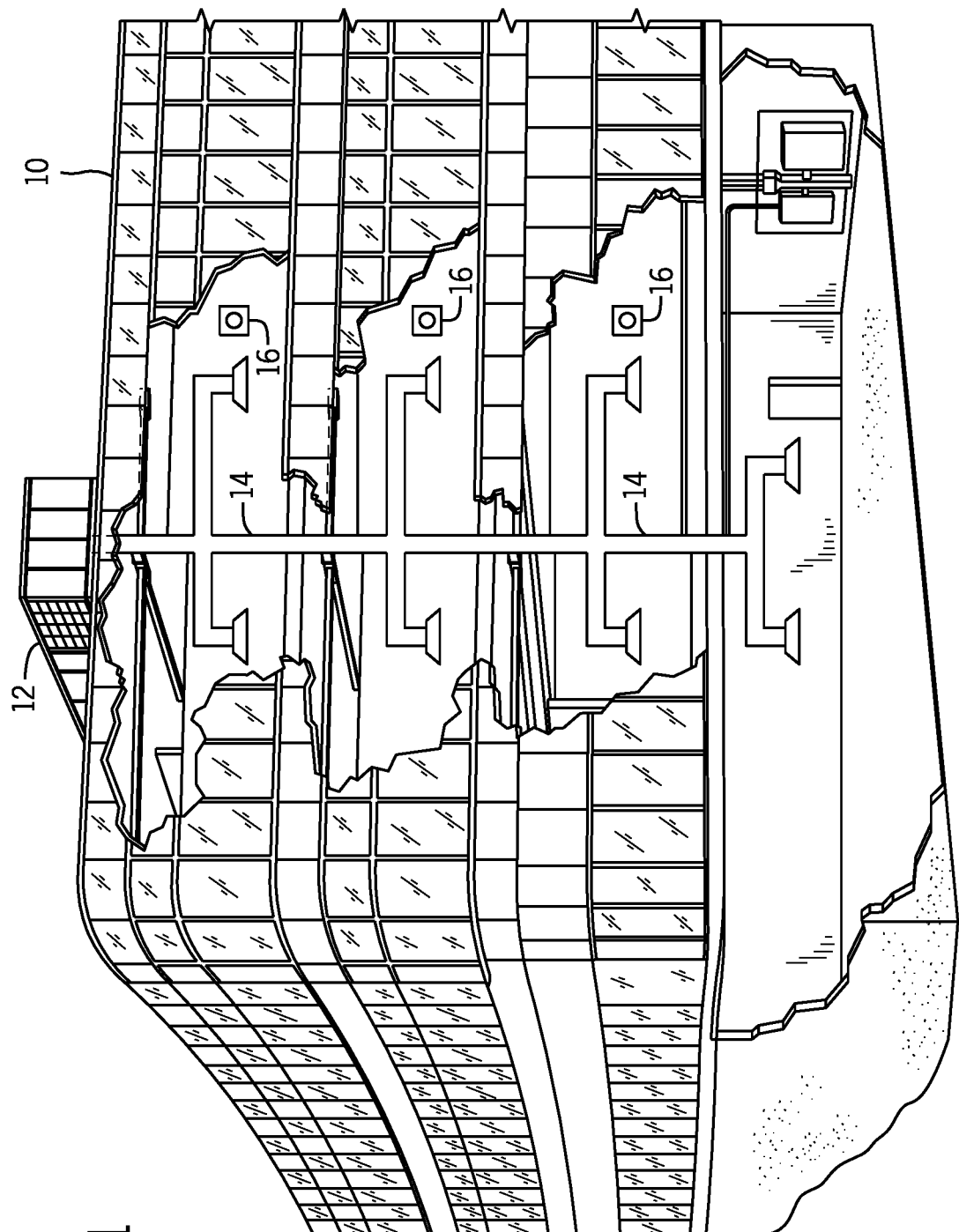
FIG. 1 is an illustration of an embodiment of a commercial or industrial HVAC system, in accordance with present techniques.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes a HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
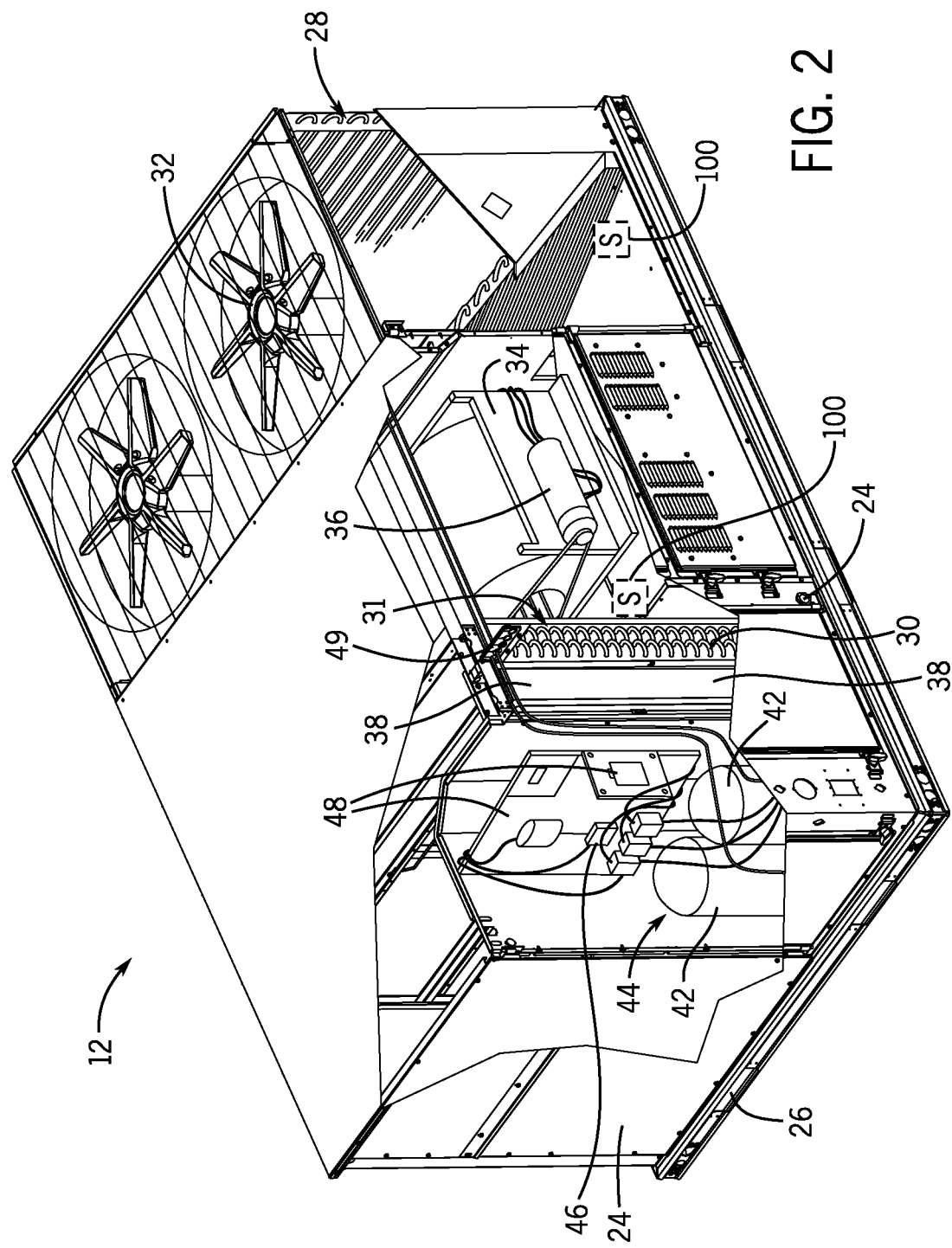
FIG. 2 is an illustration of an embodiment of a packaged unit of the HVAC system, in accordance with present techniques.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking mechanisms such as rain from leaking into the building 10.

The HVAC unit 12 includes heat exchangers 28 and 30 in fluid communication with one or more refrigeration circuits. Tubes within the heat exchangers 28 and 30 may circulate refrigerant through the heat exchangers 28 and 30. For example, the refrigerant may be R-410A. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
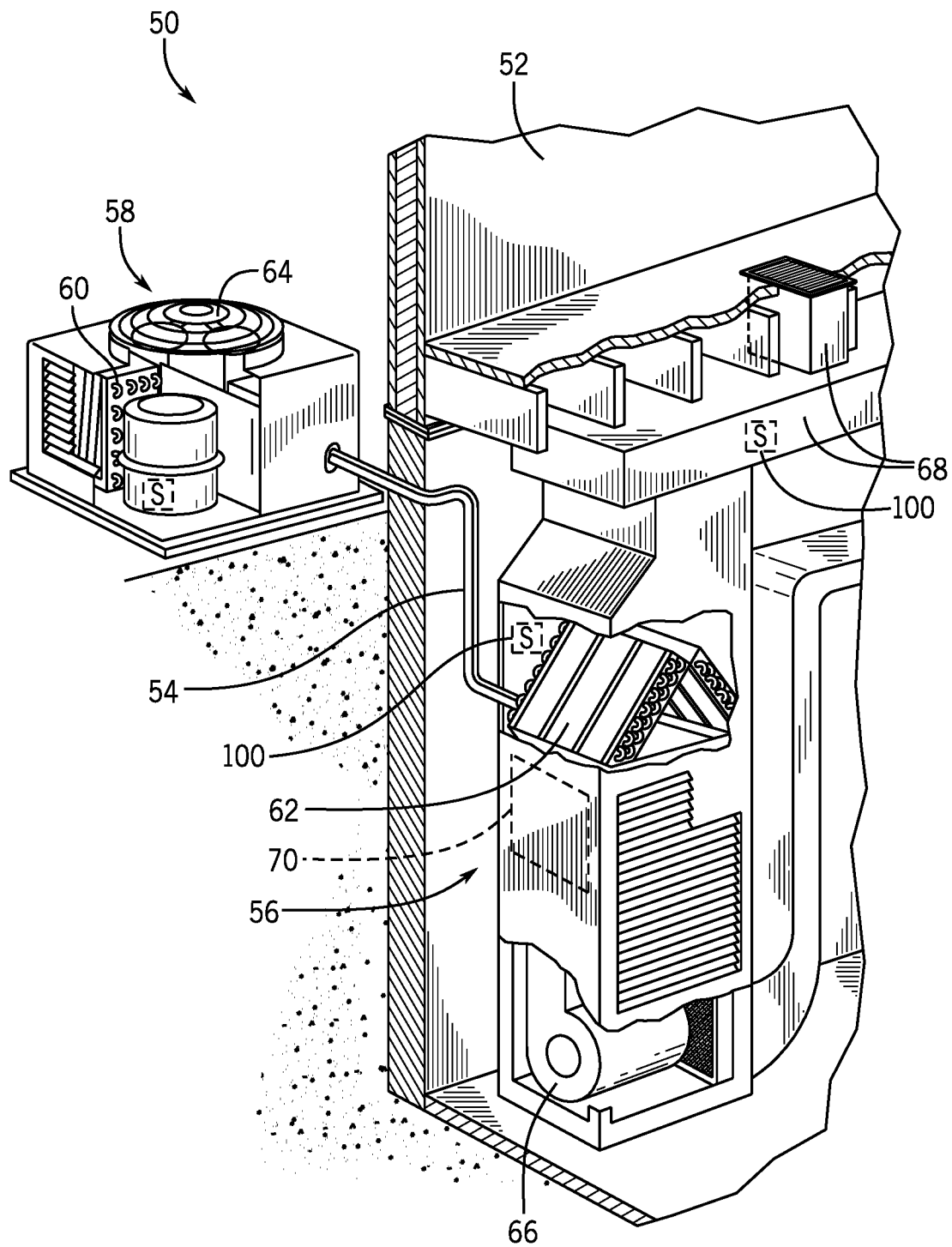
FIG. 3 is an illustration of an embodiment of a split system of the HVAC system, in accordance with present techniques.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger that is separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
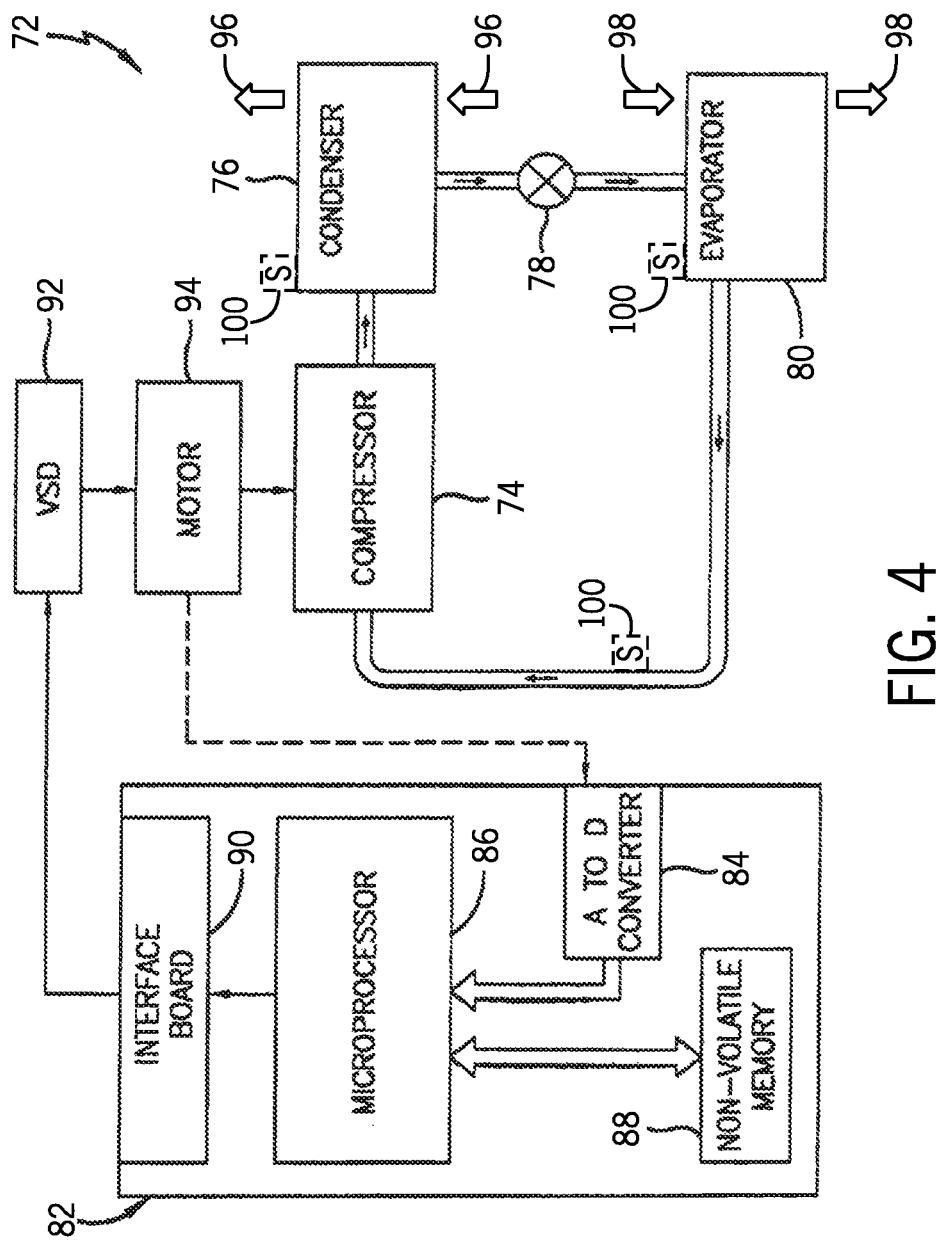
FIG. 4 is a schematic diagram of an embodiment of a refrigeration system of the HVAC system, in accordance with present techniques.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As mentioned, the HVAC systems discussed herein include a leak detection system that monitors for refrigerant leaks from the vapor compression system 72. Accordingly, the leak detection system includes one or more refrigerant sensors or refrigerant sensor systems disposed in one or more suitable locations throughout the HVAC unit 12, the residential heating and cooling system 50, the vapor compression system 72, or other HVAC systems. The refrigerant sensors are capable of detecting leaked refrigerant from any HVAC system component, and thus are advantageously located near or proximate to components of the vapor compression system 72 having refrigerant therein. For example, as illustrated in FIG. 2, refrigerant sensors may be placed in sensor locations 100 near the heat exchanger 28 and/or near the heat exchanger 30 of the HVAC unit 12.

Additionally, as illustrated in FIG. 3, refrigerant sensors may be placed in sensor locations 100 near the heat exchanger 60, near the evaporator coil 62, and/or within the ductwork 68 of the residential heating and cooling system 50. Moreover, as illustrated in FIG. 3, refrigerant sensors may be optionally placed in sensor locations 100 along conduits, near the condenser 76, and/or near the evaporator 80 of the vapor compression system 72. In general, placing the refrigerant sensors near, within inches, within feet, or proximate to components having refrigerant flowing therein increases a probability that a detectable amount of leaked refrigerant will reach the refrigerant sensors. Moreover, the refrigerant sensors may be desirably placed within bent portions of the ductwork 68, corners of rooms of the building 10, or other locations that generally hinder airflow, such that leaked refrigerant near the refrigerant sensors is less likely to be dissipated or displaced by the airflow before detection. The refrigerant sensors may also be placed in any other suitable locations, such as within a utility room, attic space, or portion of the building 10, to monitor for refrigerant leaks in accordance with the embodiments discussed herein.

Figure 5:
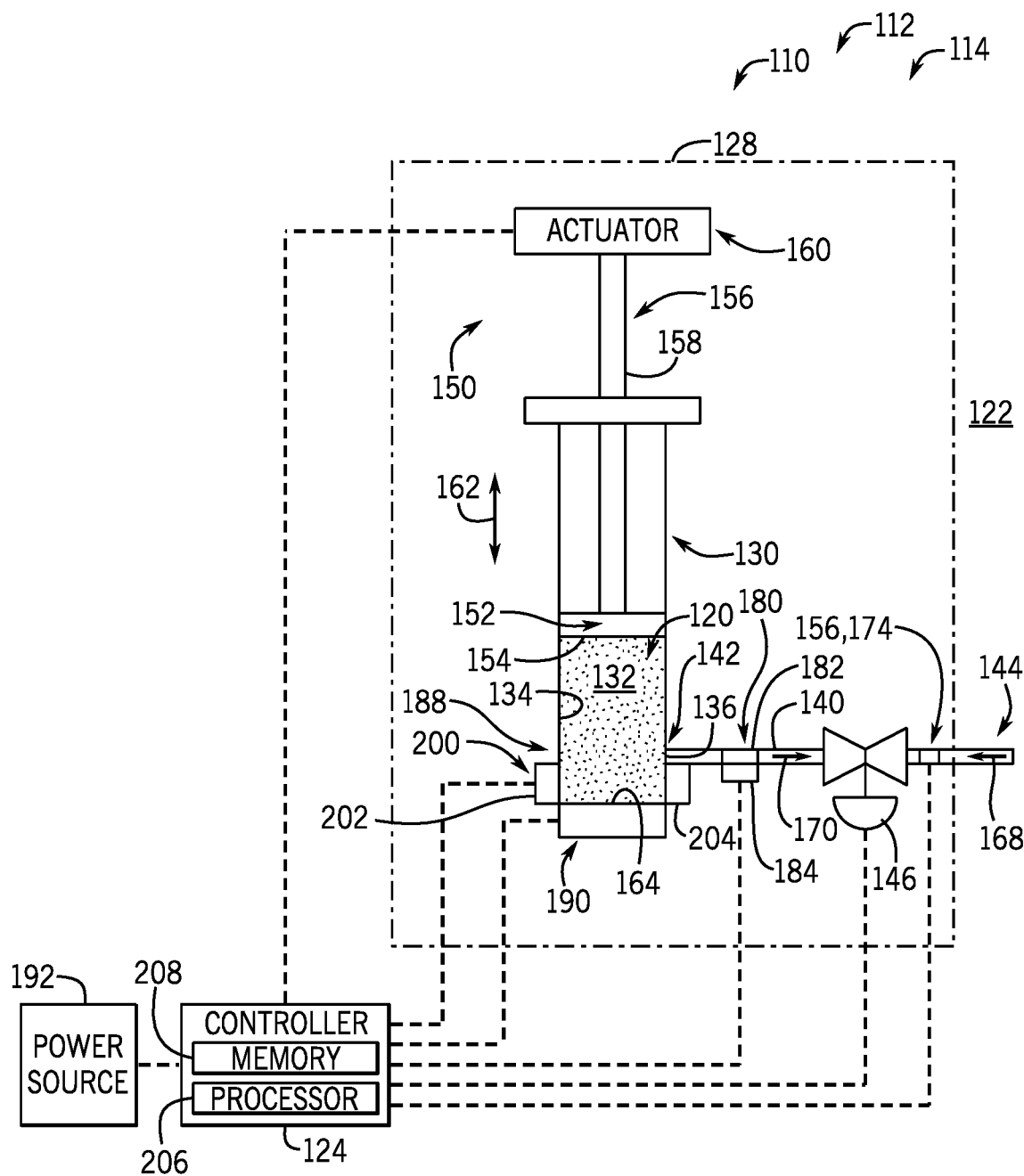
FIG. 5 is a schematic diagram of an embodiment of a refrigerant sensor system in a leak detection system of the HVAC system, in accordance with present techniques.

FIG. 5 is a schematic diagram of an embodiment of a refrigerant sensor 110 or a suitable refrigerant sensor system in a leak detection system 112 designed and configured to detect refrigerant leaks within a HVAC system 114. The HVAC system 114 may be any suitable HVAC system discussed herein, including the HVAC unit 12, the residential heating and cooling system 50, the vapor compression system 72, or other HVAC systems. During operation, the refrigerant sensor 110 generally collects and cools an air sample 120 from a monitored air volume 122, and then detects refrigerant that condenses from the air sample. In general, detection of refrigerant outside of the vapor compression system 72 is indicative of a refrigerant leak. Moreover, the refrigerant employed in the vapor compression system 72 may be any desired refrigerant, such as R32, R1234ze, R1234yf, R-454A, R-454C, R-455A, R-447A, R-452B, R-454B, and the like that is used by the HVAC system 114 for conditioning an interior space of the building 10. As used herein, "refrigerant" refers to any operating fluid normally contained within the vapor compression system 72 and employed to facilitate cooling, including any suitable refrigerant or refrigerant mixture having additives such as oils, indicators, stabilizers, dyes, fragrances, or any combination thereof. The term "refrigerant" may broadly reference commercial refrigerants and may exclude contaminants, such as water. As discussed herein, a controller 124 may monitor the refrigerant sensor 110 to detect refrigerant that has leaked from the vapor compression system 72, and perform suitable control actions to mitigate the refrigerant leak. In the present embodiment, the controller 124 is the control panel 84 of the vapor compression system 72 discussed above with reference to FIG. 4, though in other embodiments, the controller 124 may be control circuitry of the refrigerant sensor 110 that is communicatively coupled to the control panel 82.

The illustrated embodiment of the refrigerant sensor 110 includes multiple components, such as elements, assemblies, units, and devices, which cooperate to enable to the refrigerant sensor 110 to detect refrigerant leaks. One or more of these components may be disposed within a housing 128 of the refrigerant sensor 110 to enhance portability and durability of the refrigerant sensor 110. For example, disposed within the housing 128, the illustrated refrigerant sensor 110 includes a vessel 130 that fluidly separates an interior volume 132 of the vessel 130 from the monitored air volume 122 outside of the vessel 130. The vessel 130 may be any suitable container for holding an air sample 120 therein, such as a syringe body, an enclosure, tube, a pipe, or a canister. In the current embodiment, walls 134 of the vessel 130 are formed of a cold-resistant and/or a pressure-resistant material, such as metal, plastic or the like. The present embodiment of the vessel 130 also includes a port 136 or opening formed within the walls 134 of the vessel 130. The port 136 may be any suitable opening that may be opened or closed to respectively fluidly couple or fluidly isolate the interior volume 132 of the vessel 130 and the monitored air volume 122. In some embodiments, the port 136 is a hole having a circular, ovular, or rectangular shape, though any suitable hole may be included within the walls 134 of the vessel 130.

Additionally, the illustrated refrigerant sensor 110 of the leak detection system 112 includes a conduit 140 disposed between the port 136 and the monitored air volume 122. More particularly, a proximal end 142 of the conduit 140 is coupled to or integrally formed with the walls 134 of the vessel 130 adjacent to the port 136, and a distal end 144 of the conduit 140 is open to the monitored air volume 122. For embodiments that include the housing 128, the distal end 144 of the conduit 140 extends out of the housing 128 and into the monitored air volume 122. In some embodiments, the conduit 140 is formed of the same material as the vessel 130, though in other embodiments, the conduit 140 may be formed of flexible or rigid tubing, or of another suitable material. As illustrated, a valve 146 is disposed along the conduit 140 to selectively open or close the port 136 to the monitored air volume 122. The valve 146 may be any suitable controllable valve, including a hydraulic valve, a pneumatic valve, a solenoid valve, a motorized valve, or any other suitable valve. As such, the valve 146 is capable of receiving control signals from the controller 124 that instruct the valve 146 to move between open, partially open, and closed positions that respectively fully couple, partially couple, or isolate the interior volume 132 of the vessel 130 from the monitored air volume 122. However, other suitable sealing elements, such as passive dampers, actuatable dampers, and the like, may be used in place of the valve 146, in certain embodiments.

As discussed above, under certain conditions, refrigerant may leak from the vapor compression system 72 and into nearby spaces. Thus, by disposing the refrigerant sensor 110 in a position having a monitored air volume 122 near the vapor compression system 72, the refrigerant sensor 110 is capable of capturing a portion of refrigerant vapor from the monitored air volume 122 in the air sample 120. To draw the air sample 120 into the vessel 130, the refrigerant sensor 110 utilizes one or more components that are collectively referred to herein as an air sample collection assembly and operated to collect air samples into the vessel 130. For example, in the illustrated embodiment, the refrigerant sensor 110 includes an air sample collection assembly 150 having a piston 152 disposed or extending within the vessel 130. As such, the piston 152 seals against the walls 134 of the vessel 130 into a sealed engagement with the vessel 130, thus forming a moveable upper boundary 154 that defines the interior volume 132 of the vessel 130 in the illustrated embodiment. Additionally, a suitable transfer mechanism 156, such as a shaft 158, is coupled between the piston 152 and an actuator 160. The actuator 160 may be any suitable actuator capable of applying force to the transfer mechanism 156 along a vertical axis 162 of the illustrated embodiment, such as a linear actuator, a hydraulic actuator, an electronic actuator, or the like.

For the embodiment of the refrigerant sensor 110 illustrated in FIG. 5, the piston 152, transfer mechanism 156, and actuator 160 are capable of cooperating or acting together as the air sample collection assembly 150 and a suitable compression assembly to draw the air sample 120 into the vessel 130, to compress the air sample 120 within the vessel 130, and to push the air sample 120 out of the vessel 130. For example, for the illustrated embodiment, based on control signals from the controller 124, the actuator 160 applies force to the transfer mechanism 156 along the vertical axis 162, which transfers the force to move the piston 152 relative to the vessel 130. As such, when the actuator 160 is pulling on the transfer mechanism, the piston 152 moves away from a lower wall 164 of the vessel 130 to increase the interior volume 132 of the vessel 130. When the valve 146 is open while the piston 152 is moving away from the lower wall 164, movement of the piston 152 reduces a pressure within the vessel 130 below atmospheric pressure, drawing an inlet airflow 168 of the air sample 120 from the monitored air volume 122 through the port 136 and into the vessel 130. The air sample 120 is thereby collected for processing and analysis within the refrigerant sensor 110. Similarly, to remove the air sample 120 from the vessel 130 of the illustrated embodiment after the processing and analysis, the actuator 160 extends the transfer mechanism 156, causing the piston 152 to move down to reduce the interior volume 132 of the vessel 130 with the valve 146 open, pushing a purge airflow 170 of the air sample 120 out of the vessel 130 through the port 136 and back into the monitored air volume 122.

Moreover, in some embodiments, the refrigerant sensor 110 may not include the illustrated piston 152. In some embodiments, other suitable components may be included within the refrigerant sensor 110 as the transfer mechanism 156 for collecting the air sample 120 based on actuation via the actuator 160. For example, in certain embodiments, a fan 174 is disposed within the conduit 140 to enable the refrigerant sensor 110 to collect the air sample 120. Additionally, it should be noted that the transfer mechanism 156 may include the fan 174, the shaft 158, or both to collect the air sample 120, as presently illustrated. In some embodiments, the fan 174 may be a reversible fan that is capable of running in a forward operation mode to draw air into the vessel 130 and in a reverse operation mode to draw air out of the vessel 130. As such, in certain embodiments, the fan 174 is actuated via the actuator 160 or the controller 124 to draw the inlet airflow 168 into the conduit 140 and into the vessel 130 during the forward operation mode of the fan 174, and to draw the purge airflow 170 out of the vessel 130 during the reverse operation mode of the fan 174. When drawing the purge airflow 170 out of the vessel 130, a suitable air intake mechanism, such as a purge inlet port, may be instructed to open to provide replacement air into the vessel 130. However, in some embodiments, the fan generates a vacuum, relative to atmospheric pressure, within the vessel 130 by drawing the purge airflow 170 out of the vessel 130. In such embodiments, the vacuum within the vessel 130 is later utilized to draw another air sample 120 into the vessel 130.

To enhance detection of refrigerant within the vessel 130, the refrigerant sensor 110 of the leak detection system 112 may include one or more components that remove water or humidity from the air sample 120. For example, the illustrated embodiment of the refrigerant sensor 110 includes a desiccant unit 180 having a desiccant element 182 and a regenerator 184. As illustrated, the desiccant element 182 is disposed within the conduit 140. In some embodiments, the desiccant element 182 is coupled within the conduit 140 via adhesive or suitable receiving features. The desiccant element 182 may be any suitable molecular sieve or other hygroscopic material that absorbs water from the air sample 120 as it is drawn into the vessel 130. However, the desiccant element 182 may be disposed within the vessel 130 or otherwise operatively coupled to vessel 130 to enable the desiccant element 182 to remove water from the air sample 120 during or after entry of the air sample 120 into the vessel 130. Additionally, the illustrated embodiment of the desiccant unit 180 includes the regenerator 184 operatively coupled to the desiccant element 182 for regenerating the desiccant element 182. The regenerator 184 may be a thermoelectric heater or other thermal source that provides energy to evaporate the water out of the desiccant element 182 during a regeneration mode of the refrigerant sensor 110, as discussed in more detail below.

Moreover, in other embodiments, the refrigerant sensor 110 may exclude the desiccant unit 180, and instead the refrigerant sensor 110 may operate via a two-step cooling process. This two-step cooling process, discussed in greater detail below, generally involves first condensing and removing water from the collected air sample 120, and then further cooling the air sample 120 to condense and detect any liquid refrigerant present in the vessel 130. In such embodiments, the refrigerant sensor 110 may include a suitable drain feature, such as an actuatable valve disposed in a lower portion 188 of the vessel 130 that is selectively openable to remove any condensed liquid from the vessel 130 in response to control signals from the controller 124. Moreover, in some embodiments, the controller 124 of the leak detection system 112 determines that the monitored air volume 122 has a low or negligible humidity, and disables water-removing functions of the refrigerant sensor 110. Additionally, in some embodiments, the refrigerant sensor 110 includes the desiccant unit 180, in addition to the components for two-step cooling, to enable enhanced water removal.

The refrigerant sensor 110 of the leak detection system 112 also includes a cooling device 190 operatively coupled to the vessel 130 that is designed and configured to cool the collected air sample 120. In the illustrated embodiment, the cooling device 190 is attached to the lower wall 164 of the vessel 130, although the cooling device 190 may alternatively be coupled to another portion of the vessel 130 or may be embedded within the walls 134 or the lower wall 164 of the vessel 130. The cooling device 190 may be any suitable device that is capable of removing heat from the air sample 120 within the vessel 130 to facilitate condensation of the refrigerant. For example, the cooling device 190 may be a thermoelectric cooling device, a cooling jacket that receives a cryogenic fluid, such as liquid nitrogen, or another suitable cooling device. In embodiments in which the cooling device 190 is a thermoelectric cooling device, the air sample 120 is cooled based on a heat flux created by an electric current. More particularly, the thermoelectric cooling device transfers thermal energy via the Peltier effect from the air sample 120 within the vessel 130, which is attached to a first side of the thermoelectric cooling device, to a suitable heat sink, which is operatively coupled to a second side of the thermoelectric cooling device in the monitored air volume 122. In this manner, the refrigerant sensor 110 uses power from a power source 192 to cool the air sample 120 to the predetermined temperature threshold. Additionally, in some embodiments, multiple cooling devices 190 may be operatively coupled to the vessel 130 at corresponding suitable locations to increase a rate at which cooling can be applied to the air sample 120 or to lower a minimum refrigeration temperature or a minimum temperature the refrigerant sensor 110 is capable of producing within the vessel 130.

Further, the refrigerant sensor 110 of the illustrated leak detection system 112 includes a liquid detection device 200 operatively coupled to the vessel 130. The liquid detection device 200 may be any suitable sensor or array for determining whether liquid is present in the vessel 130. For example, in the illustrated embodiment, the liquid detection device 200 is an optical sensor having an emitter 202 and a detector 204 that cooperate to measure a refractive index of the air sample 120 in a lower portion 188 of the vessel 130. That is, since it is recognized that gravity drives any liquid condensed within the vessel 130 to collect in a lower portion 188 of the vessel 130, the liquid detection device 200 is disposed at the lower portion 188 of the vessel 130, near the lower wall 164, to enhance liquid detection.

As such, in certain embodiments, the illustrated liquid detection device 200 is capable of detecting a change in refractive index that occurs when liquid condenses near the lower wall 164 of the vessel 130. For example, the liquid detection device 200 may first measure a first refractive index of the air sample 120 when condensed liquid is not present in the vessel 130. Subsequently, when condensed refrigerant is present in the vessel 130, the liquid detection device 200 may measure a second refractive index of the air sample 120 that is substantially different from the first refractive index. For embodiments in which water is removed and the only substantial condensable in the air sample 120 is refrigerant, any substantial change in refractive index that indicates the presence of condensed liquid may be an indication that leaked refrigerant is present in the monitored air volume 122.

In some embodiments, the liquid detection device 200 is also capable of analyzing the composition of liquids that condense within the vessel 130. For example, in certain embodiments, the liquid detection device 200 may optically measure a refractive index of a condensed liquid in the lower portion 188 of the vessel 130, and a suitable controller may identify the liquid as being refrigerant, water, another condensable, or a combination thereof, based on the refractive index. Additionally, at least a portion of the vessel 130 may be formed of an optical glass or another suitable material that enables the liquid detection device 200 to optically monitor the interior volume 132 of the vessel 130 through the walls 134 of the vessel 130. Moreover, in other embodiments, the liquid detection device 200 may alternatively be an image sensor that visually monitors for liquid within the vessel 130, a conductivity sensor that electrically monitors for liquid within the vessel 130, or any other suitable device for detecting whether liquid is present in the vessel 130.

For the embodiment illustrated in FIG. 5, multiple components of the refrigerant sensor 110 are communicatively coupled to the controller 124. Moreover, as mentioned, the illustrated controller 124 is the control panel 82, which governs operation of the HVAC system 114 in addition to the leak detection system 112. As such, the controller 124 may include a distributed control system (DCS) or any computer-based workstation. For example, the controller 124 can be any device including a general purpose or an application-specific processor 206, both of which may generally include memory 208 or suitable memory circuitry for storing instructions. The controller 124 may draw power from the power source 192, such as a power source that provides power to the building 10. In such embodiments, the refrigerant sensor 110 is advantageously located near the power source 192 of HVAC system 114. However, in certain embodiments, the controller 124 is a separate controller for controlling the refrigerant sensor 110 that communicates with a HVAC controller, and the power source 192 is a separate power source from the power source of the HVAC system 114.

The processor 206 illustrated in FIG. 5 may include one or more processing devices, and the memory 208 may include one or more tangible, non-transitory, machine-readable media collectively storing instructions executable by the processor 206 to control the refrigerant sensor 110 and/or the HVAC system 114. The processor 206 of the controller 124 may be used to control and modify operations of the leak detection system 112 and the HVAC system 114 to perform the actions disclosed herein. More specifically, the controller 124 may receive input signals from various components of the HVAC system 114 and may output control signals to control and communicate with various components in the HVAC system 114. The processor 206 of the controller 124 may control the flowrates, motor speeds, valve positions, and emissions, among other suitable parameters, of the HVAC system 114. Additionally, the processor 206 may control operation of the various components of the refrigerant sensor 110 discussed herein.

Although the controller 124 has been described as having the processor 206 and the memory 208, it should be noted that the controller 124 may include or be communicatively coupled to a number of other computer system components to enable the controller 124 to control the operations of the HVAC system 114 and the related components. For example, the controller 124 may include a communication component that enables the controller 124 to communicate with other computing systems. The controller 124 may also include an input/output component that enables the controller 124 to interface with users via a graphical user interface or the like. In addition, the communication between the controller 124 and other components of HVAC system 114 may be via a wireless connection, such as through Bluetooth® Low Energy, ZigBee®, WiFi®, or may be via a wired connection, such as through Ethernet. In some embodiments, the controller 124 includes a laptop, a smartphone, a tablet, a personal computer, a human-machine interface, or the like. In some embodiments, functional aspects may be embodied using hardware implementations, software implementations, or any combination thereof. For example, logic elements of the controller 124 may include a field-programmable gate array (FPGA), or other specific circuitry.

Figure 6:
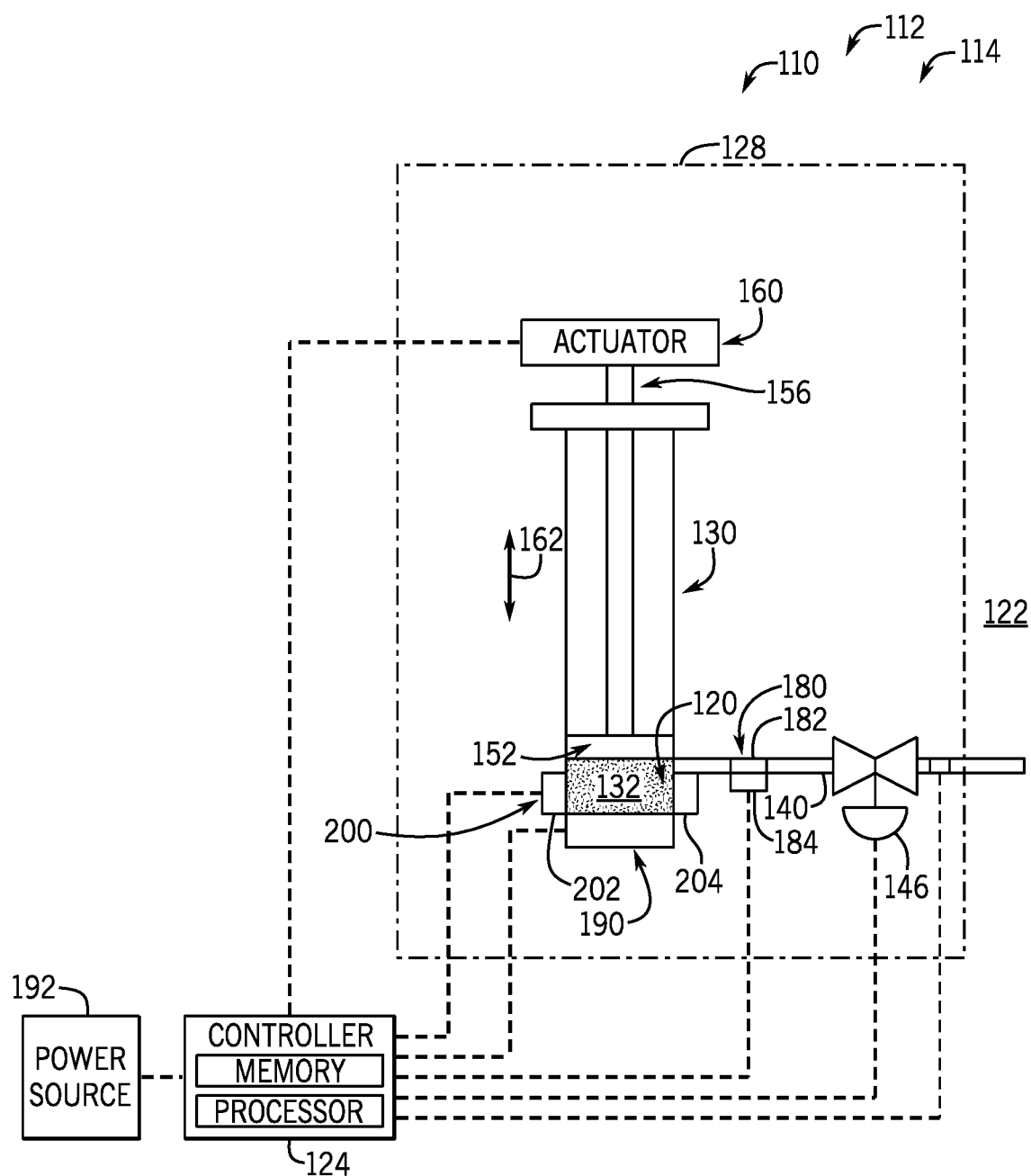
FIG. 6 is a schematic diagram of the refrigerant sensor system of the leak detection system of FIG. 5 in which an air sample is compressed, in accordance with present techniques.

FIG. 6 is a schematic diagram of the embodiment of the leak detection system 112 of FIG. 5 having the air sample 120 compressed therein. As discussed above, the actuator 160 is designed and configured to apply force to the transfer mechanism 156 to move the piston 152 down along the vertical axis 162 within the vessel 130, thus reducing the interior volume 132 of the vessel 130. For the illustrated embodiment, because the valve 146 is closed during the movement of the piston 152, the air sample 120 within the vessel 130 is compressed. In some embodiments, the refrigerant sensor 110 compresses the air sample 120 to a threshold pressure to raise the dew point of the refrigerant within the air sample 120. For example, at a first pressure, refrigerant within in the air sample 120 may have a dew point of 10 degrees Celsius (° C.). At a second pressure, greater than the first, the refrigerant within the air sample 120 may have a dew point of 20° C. As such, because the refrigerant is capable of condensing from the air sample 120 at a higher temperature, increasing the pressure of the air sample 120 within the vessel 130 reduces the amount of cooling involved to condense refrigerant from the air sample. Thus, compressing the air sample 120 increases an energy efficiency of the refrigerant sensor 110 by reducing the amount of energy used to operate the cooling device 190 to condense the refrigerant for detection. Further, compressing the air sample 120 enables the use of a lower cooling capacity cooling device, such as a thermoelectric cooling device, reducing the cost and complexity of the leak detection system 112.

Figure 7:
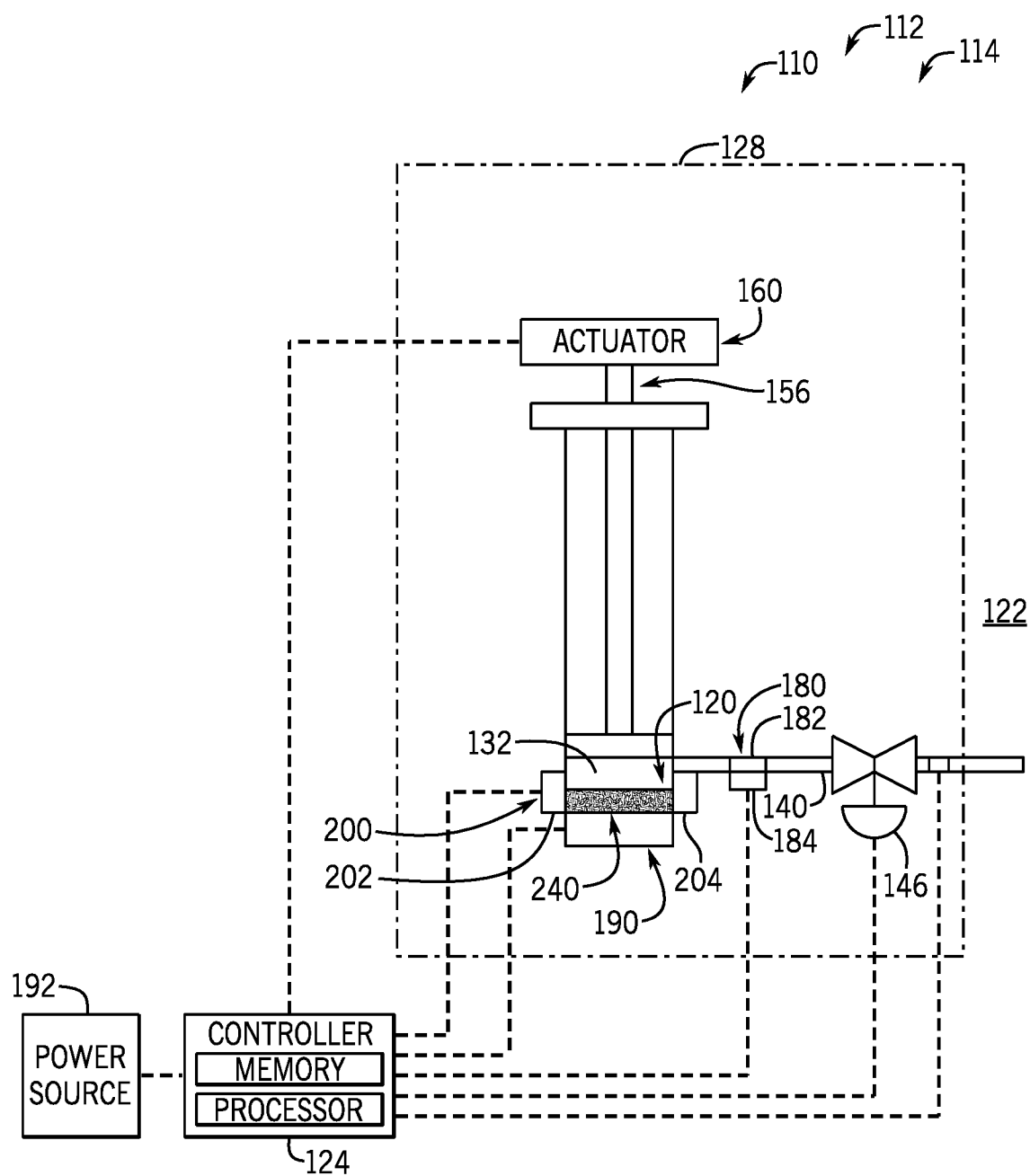
FIG. 7 is a schematic diagram of the refrigerant sensor system of the leak detection system of FIG. 5 in which at least a portion of the air sample is condensed, in accordance with present techniques.

FIG. 7 is a schematic diagram of the embodiment of the leak detection system 112 of FIGS. 5 and 6 in which a condensable portion of the air sample 120 has been converted to liquid. As discussed above, the cooling device 190 may be operated to remove thermal energy from the air sample 120, thus condensing any leaked refrigerant present in the air sample 120 into condensed refrigerant liquid 240. It may be noted that the condensed refrigerant liquid 240 may include one or more refrigerant additives discussed above, as additives are normally contained within the vapor compression system 72, and a presence of the additives outside of the vapor compression system 72 is generally indicative of a refrigerant leak. In certain embodiments, the controller 124 of the leak detection system 112 operates the cooling device 190 to remove thermal energy from the air sample 120 until the air sample 120 reaches a threshold cooling temperature. The controller 124 may monitor a current temperature of the air sample based on feedback from any suitable temperature sensor, based on calculations of a known air temperature of the surrounding environment and a known amount of thermal energy removed from the air sample 120, or via any other suitable considerations. Additionally, the refrigerant sensor 110 may provide the thermal energy removed from the air sample 120 to any suitable heat sink, such as a portion of the vapor compression system 72, the monitored air volume 122, the regenerator 184, or another suitable heat sink. As discussed in more detail below, condensing leaked refrigerant out of the air sample 120 enables the liquid detection device 200 to detect a refrigerant leak.

Figure 8:
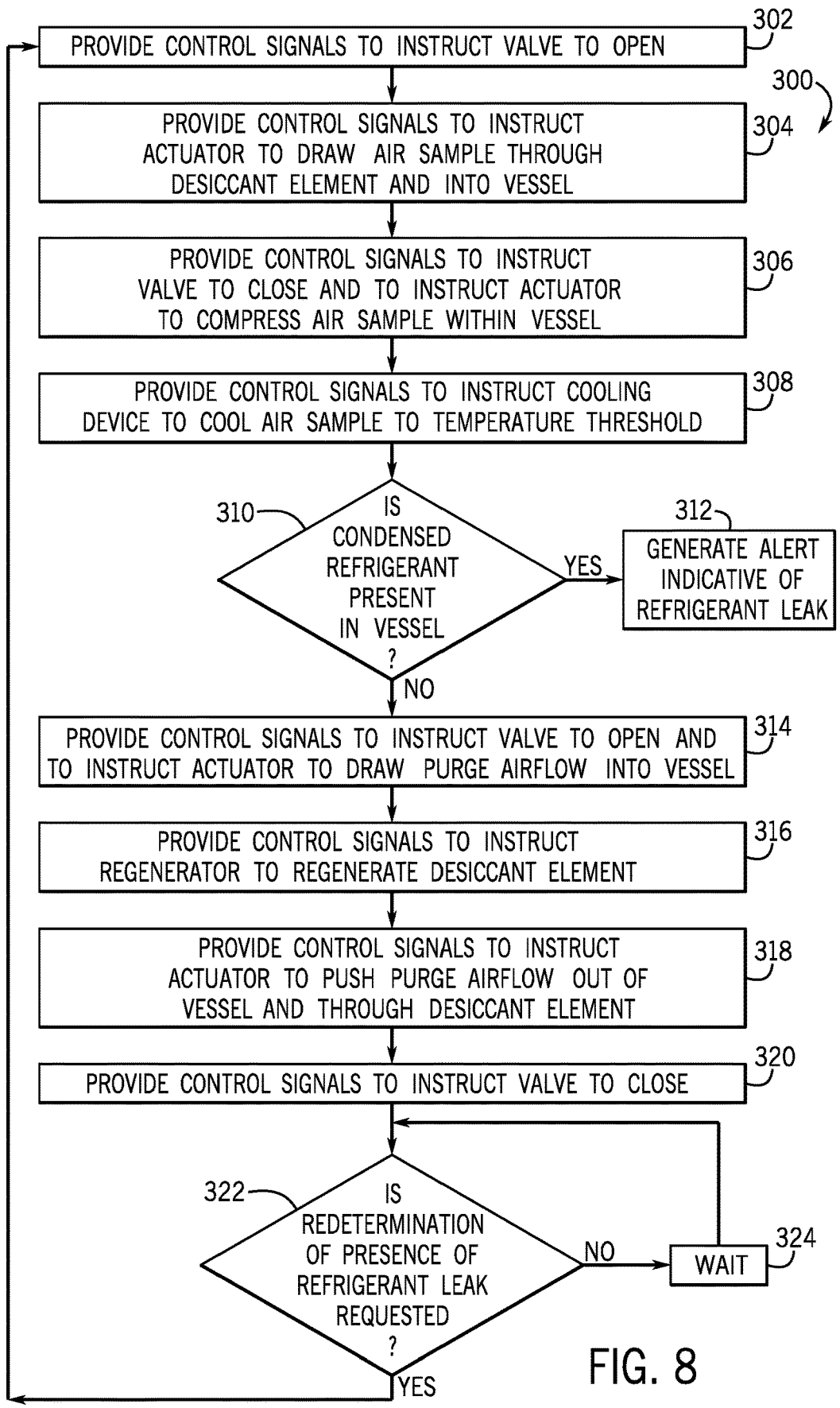
FIG. 8 is a flow diagram representing an embodiment of a process of operating the leak detection system of FIG. 5, in accordance with present techniques.

FIG. 8 is a flow diagram illustrating an embodiment of a process 300 of operating the leak detection system 112 having the refrigerant sensor 110 of FIG. 5. It is to be understood that the steps discussed herein are merely exemplary, and certain steps may be omitted or performed in a different order than the order discussed herein. In some embodiments, the process 300 may be performed by the processor 206 of the controller 124, which may be the HVAC controller or a separate controller for the leak detection system 112 that is communicatively coupled to the HVAC controller. Additionally, although the process 300 is discussed with reference to the refrigerant sensor 110 of FIG. 5 having the actuator 160, the transfer mechanism 156, the piston 152, and the desiccant unit 180, the refrigerant sensor 110 may include any other suitable features for performing the steps discussed herein.

To begin the illustrated process 300, the controller 124 provides control signals to instruct the valve 146 to open, as indicated in block 302. For example, the valve 146 may be maintained normally closed during an idle mode of the leak detection system 112 to enhance operation of the desiccant element 182 and other components of the refrigerant sensor 110. Thus, by fluidly isolating the desiccant element 182 from the monitored air volume 122 when the refrigerant sensor 110 is not actively collecting or releasing the air sample 120, the desiccant element 182 is protected against incidental humidity from the monitored air volume 122, thus extending operation of the desiccant element 182 between regeneration modes. However, when sampling of the monitored air volume 122 for detection of leaked refrigerant is requested, such as during an active detection mode of the refrigerant sensor 110, the controller 124 instructs the valve 146 to open.

Additionally, in the illustrated process 300, the controller 124 provides control signals to instruct the actuator 160 to draw the air sample 120 through the desiccant element 182 and into the vessel 130, as indicated in block 304. The actuator 160 draws the air sample 120 through the desiccant element 182 by applying force to the transfer mechanism 156, which pulls upward on the piston 152 and creates pressure below atmospheric pressure within the vessel 130. Thus, air from the monitored air volume 122 is pulled through the desiccant element 182, which absorbs at least a portion of the water from the air sample 120. In certain embodiments, by removing the water from the air sample 120, later detection of any condensed refrigerant within the vessel 130 may be improved or simplified, such that the presence of any liquid within the vessel 130 may be indicative of a refrigerant leak.

As indicated in block 306, the controller 124 next provides control signals to instruct the valve 146 to close and to instruct the actuator 160 to compress the air sample 120 within vessel 130. By closing the valve 146, the air sample 120 is captured or contained within the vessel 130 for further processing and analysis. In some embodiments, the actuator 160 compresses the air sample 120 contained within the vessel 130 to a predetermined pressure threshold, to a predetermined volume, or the like. For example, the predetermined pressure threshold may be 2 atm, 5 atm, 10 atm, 100 atm, 500 atm, or more. In such embodiments, the increased pressure of the air sample 120 causes any refrigerant present within the air sample 120 to have a correspondingly raised dew point. Indeed, the present disclosure utilizes a generally proportional relationship between pressure and the dew point of the refrigerant in the air sample 120 to reduce the amount of cooling used to condense leaked refrigerant from the air sample 120. However, in some embodiments, the controller 124 does not instruct the refrigerant sensor 110 to compress the air sample 120 or does not include a compression assembly, and instead instructs the cooling device 190 to generate an increased amount of cooling, such as cryogenic cooling, in block 308.

In the present embodiment, the controller 124 next provides control signals to instruct the cooling device 190 to cool the air sample 120 to a predetermined temperature threshold, as indicated in block 308. In certain embodiments, the controller 124 selects the predetermined temperature threshold to be a temperature at or below which any refrigerant vapor will condense as a liquid from the air sample 120. In embodiments in which the refrigerant sensor 110 also compresses the air sample 120, the cooling is reduced based on the raised dew point of the refrigerant within the air sample 120. Moreover, in some embodiments, the controller 124 instructs the refrigerant sensor 110 to cool and compress the refrigerant sensor 110 simultaneously by instructing the actuator 160 and the cooling device 190 to operate during a common time frame.

Additionally, the controller 124 determines whether a condensed refrigerant is present in the vessel 130, as indicated in block 310. In the present embodiment, the controller 124 determines whether the condensed refrigerant is present in the vessel 130 based on sensor signals provided by the liquid detection device 200. For example, the liquid detection device 200 may monitor the refractive index in a lower portion 188 of the vessel 130 to determine whether the air sample 120 has a refractive index indicative of a condensed refrigerant liquid. Then, in response to determining that the condensed refrigerant is present in the vessel 130, the controller 124 generates an alert indicative of a refrigerant leak, as indicated in block 312. By generating the alert, the controller 124 of the leak detection system 112 can inform users and/or other computing devices of the refrigerant leak. In addition to generating the alert, the leak detection system 112 may perform any other suitable control actions in response to the detected refrigerant leak, such as containing the leaked refrigerant within the vessel 130 until a service technician repairs the leak and resets the refrigerant sensor 110, instructing the HVAC system 114 to cease operation, and so forth.

In response to determining that condensed refrigerant is not present in the vessel 130, the controller 124 provides control signals to instruct the valve 146 to open, as indicated in block 314, which releases the pressurized air sample 120 back into the monitored air volume 122. As also indicated in block 314, the controller 124 also instructs the actuator 160 to draw purge air into the vessel 130. In other words, when the refrigerant leak is not detected, the controller 124 generally instructs the refrigerant sensor 110 to reset for future sampling of the monitored air volume 122. By opening the valve 146, the refrigerant sensor 110 is again fluidly coupled to the surrounding environment, and pressure within the vessel 130 returns to approximately atmospheric pressure. Then, as the piston 152 is actuated upward and the interior volume 132 increases, the refrigerant sensor 110 draws additional air into the vessel 130 as the purge airflow 170, which mixes with any portion of the air sample 120 that remains in the vessel 130 after the valve 146 is opened.

In the present embodiment of the process 300, the controller 124 next provides control signals to instruct the regenerator 184 of the desiccant unit 180 to regenerate the desiccant element 182, as indicated in block 316. In embodiments in which the regenerator 184 is a thermoelectric heater, the controller 124 instructs the regenerator 184 to provide thermal energy to the desiccant element 182. When heated, the desiccant element 182 may release all or a substantial portion of the water it has previously absorbed from the air sample 120 and/or the purge airflow 170. Then, the controller 124 provides control signals to instruct the actuator 160 to push the purge airflow 170 out of the vessel 130 and through the desiccant element 182, as indicated in block 318. In this manner, the refrigerant sensor 110 directs air over the desiccant element 182 to further regenerate the desiccant element 182 by carrying away the water released by the desiccant element 182. Additionally, in some embodiments, the controller 124 instructs the refrigerant sensor to push the air sample 120 out of the vessel 130 and over the desiccant element 182 without drawing in the additional purge airflow. However, drawing in the additional purge airflow 170 increases an amount of air available for moving released water out of the desiccant element 182 during regeneration.

Once the desiccant element 182 is regenerated and/or the actuator 160 has reached a lower position, the controller 124 provides control signals to instruct the valve 146 to close, as indicated in block 320. Thus, the refrigerant sensor 110 is ready for use via the leak detection system 112 for future monitoring of the monitored air volume 122. For example, in the present embodiment of the process 300, the controller 124 determines whether redetermination of the presence of a refrigerant leak requested, as indicated in block 322. If redetermination of the presence of the refrigerant leak is not requested, the controller 124 may wait, as indicated in block 324, a threshold amount of time before returning to block 322. The threshold amount of time may be any suitable amount of time, such as 1 minute, 5 minutes, 30 minutes, 60 minutes, and so forth. Thus, the leak detection system 112 can enhance sensor life by operating the refrigerant sensor 110 only when desired, such as based on user request. However, in some embodiments, the leak detection system 112 operates the refrigerant sensor 110 continuously, such that the controller 124 does not close the valve 146 after sensor operation or reopen the valve 146 for sensor operation. Thus, when the controller requests determination of the presence of leaked refrigerant in the monitored air volume 122, the controller 124 returns to block 302 to provide control signals to instruct the valve to open and to repeat the process 300.

Figure 9:
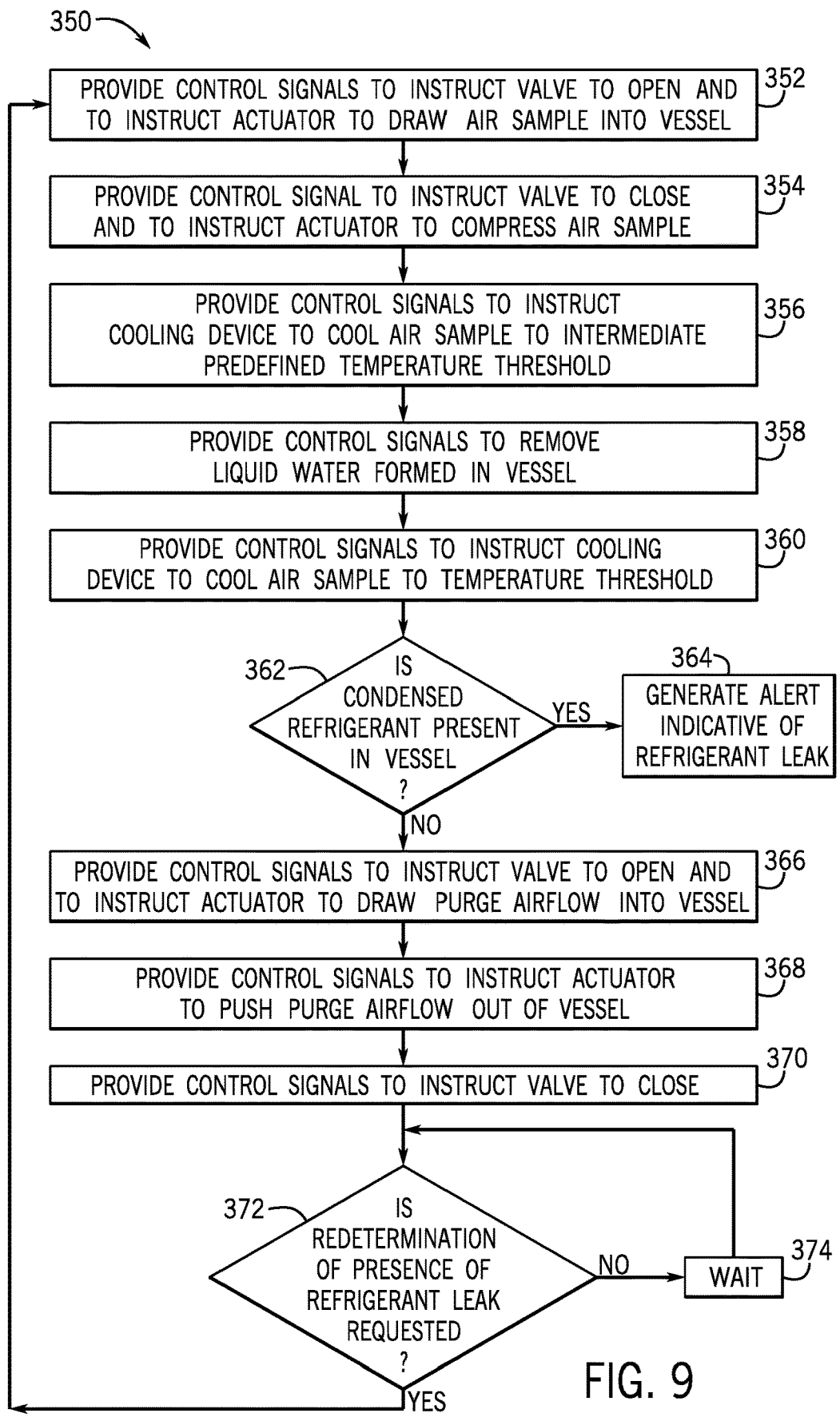
FIG. 9 is a flow diagram representing an embodiment of a two-step cooling process for operating the leak detection system of FIG. 5, in accordance with present techniques.

FIG. 9 is a flow diagram illustrating an embodiment of a process 350 of operating the leak detection system 112 having an embodiment of the refrigerant sensor 110 that operates via a two-step cooling process that addresses condensables other than leaked refrigerant in the monitored air volume 122. In particular, the illustrated process 350 includes certain differences from the process 300 of FIG. 8 according to the use of a preliminary cooling step for condensing and removing water from the air sample 120 before condensing refrigerant from the air sample 120. It is to be understood that the steps discussed herein are merely exemplary, and certain steps may be omitted or performed in a different order than the order discussed herein. In some embodiments, the process 350 may be performed by the processor 206 of the controller 124. Additionally, although the process 350 is discussed with reference to the refrigerant sensor 110 having the actuator 160, the transfer mechanism 156, and the piston 152, and not having the desiccant unit 180, the refrigerant sensor 110 may include any suitable features for performing the steps discussed herein, in accordance with the present disclosure.

To begin the illustrated process 350, the controller 124 provides control signals to instruct the valve 146 to open and to instruct the actuator 160 to draw the air sample 120 into vessel, as indicated in block 352. Thus, as discussed above with reference to block 302 and block 304 of process 300 of FIG. 8, the air sample 120 is drawn into the vessel 130. However, because the desiccant element 182 may not be included in the refrigerant sensor 110 of the present process 350, water or humidity within the monitored air volume 122 is also drawn into the vessel 130 as part of the air sample 120.

The controller 124 also provides control signals to instruct the valve 146 to close and to instruct the actuator 160 to compress the air sample 120, as indicated in block 354. As discussed above with reference to block 306 of process 300 of FIG. 8, the air sample 120 is therefore collected or contained within the vessel 130. Additionally, by reducing the interior volume 132 of the vessel 130 via the actuator, the controller 124 of the leak detection system 112 increases the dew point of condensables, including water and refrigerant, in the air sample 120. However, in embodiments in which the refrigerant sensor 110 does not compress the air sample 120, an additional amount of cooling may be applied in the subsequent blocks of the process 350.

The controller 124 next provides control signals to instruct the cooling device 190 to cool the air sample 120 to an intermediate predefined temperature threshold, as indicated in block 356. In some embodiments, the intermediate predefined temperature threshold is set as a threshold below the dew point of water, and above the dew point of the refrigerant, at the particular pressure of the air sample 120. As such, when the air sample 120 is cooled to the intermediate predefined temperature threshold, any water present in the air sample 120 condenses into liquid, while any refrigerant remains in the vapor phase within the air sample 120. The controller 124 following the illustrated process 350 then provides control signals to remove any liquid water formed in vessel 130, as indicated in block 358. For example, the refrigerant sensor 110 actuates the actuatable valve disposed in a lower portion 188 of the vessel 130 to remove the liquid water from the vessel 130. In certain embodiments, the refrigerant sensor 110 only opens the actuatable valve in response to the liquid detection device 200 determining that liquid water is present in the vessel 130. In this manner, the refrigerant sensor 110 can utilize a first portion of the two-step cooling process to remove water from the air sample 120 to enhance detection of any liquid refrigerant therein.

Next, the controller 124 provides control signals to instruct the cooling device 190 to cool the air sample 120 to the predefined temperature threshold, as indicated in block 360. This step also corresponds to block 308 of the process 300 of FIG. 8 discussed above, in that any liquid refrigerant within the air sample 120 is condensed into a liquid within the vessel 130 for detection, either before, during, or after compression of the air sample 120. Thus, the controller 124 next determines whether condensed refrigerant is present in the vessel 130, as indicated in block 362, based on sensor signals from the liquid detection device 200, as discussed above.

In response to determining, as indicated in block 362, that condensed refrigerant is present in vessel 130, the controller 124 generates an alert indicative of the refrigerant leak, as indicated in block 364 and as discussed above with reference to block 312 of process 300. Additionally, in response to determining that condensed refrigerant is not present in the vessel 130, the controller 124 provides control signals to instruct the valve 146 to open and to instruct the actuator 160 to draw the purge airflow 170 into the vessel 130, as indicated in block 366 and as discussed above with reference to block 314 of process 300.

Thus, when a refrigerant leak is not present, the refrigerant sensor 110 operated via the process 350 can reset for further monitoring of the monitored air volume 122 without utilizing an energy usage associated with regenerating a desiccant element 182. That is, the controller 124 next provides control signals to instruct the actuator 160 to push the purge airflow out of the vessel 130, as indicated in block 368, to purge any residual portion of air sample 120 out of the vessel 130. In the present embodiment of the process 350, the controller 124 may then proceed to provide control signals to instruct the valve 146 to close, as indicated in block 370, and to determine whether redetermination of the presence of a refrigerant leak is requested, as indicated in block 372. In response to determining that redetermination is not yet requested, the controller 124 waits, as indicated in block 374, and as discussed above. In response to determining that redetermination of the refrigerant leak is requested, the refrigerant sensor 110 returns to block 352 to reopen the valve 146 and to repeat the process 350 for monitoring of any leaked refrigerant.

Accordingly, the present disclosure is directed to embodiments of a leak detection system that monitors an environment of a building or a HVAC system associated with a building for refrigerant leaks. To detect leaks, the refrigerant management system uses a refrigerant sensor that captures an air sample within a vessel of the refrigerant sensor and cools the air sample to a predefined temperature threshold such that condensable components within the air sample, including leaked refrigerant, are condensed into liquid. The refrigerant sensor may also remove any water from the air sample and/or compress the air sample to enhance detection of any refrigerant within the air sample. Then, in response to detecting condensed refrigerant from the air sample, a controller can determine that a refrigerant leak has occurred from the vapor compression system. If leaked refrigerant is not detected within the air sample, the refrigerant sensor releases the air sample and continues monitoring the surrounding environment. In contrast, when leaked refrigerant is detected, any suitable control actions can be performed by the controller. In this manner, refrigerant leak detection systems having the refrigerant sensors disclosed herein may easily detect refrigerant leaks and manage the refrigerant leaks accordingly.

While only certain features and embodiments of the present disclosure have been illustrated and described, many modifications and changes may occur to those skilled in the art, such as variations in sizes, dimensions, structures, shapes and proportions of the various elements, values of parameters including temperatures, pressures, and so forth, mounting arrangements, use of materials, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the embodiments, all features of an actual implementation may not have been described, such as those unrelated to the presently contemplated best mode of carrying out the disclosure, or those unrelated to enabling the claimed features. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A refrigerant leak detection system for a heating, ventilation, and air conditioning (HVAC) system, wherein the refrigerant leak detection system comprises:
   a vessel comprising walls configured to contain an air sample;
   a cooling device operatively coupled to the walls of the vessel and comprising a cooled surface configured to cool the vessel;
   a liquid detection device operatively coupled to a bottom portion of the walls of the vessel and comprising optical circuitry or electrical circuitry configured to detect liquid in the vessel; and
   an actuator configured to actuate a transfer mechanism that is operatively coupled to the vessel and configured to provide a pressure differential to collect the air sample in the vessel.

2. The refrigerant leak detection system of claim 1, wherein the vessel, the cooling device, the liquid detection device, and the actuator are integral components of a sensor.

3. The refrigerant leak detection system of claim 1, comprising a controller configured to:
   actuate the actuator to collect the air sample in the vessel;
   activate the cooling device to cool the air sample to a predefined temperature threshold;
   control the liquid detection device to identify whether a condensed refrigerant is present in the vessel; and
   instruct the HVAC system to modify operation when the condensed refrigerant is present in the vessel.

4. The refrigerant leak detection system of claim 1, comprising a compression assembly operatively coupled to the vessel and configured to compress the air sample against the walls of the vessel.

5. The refrigerant leak detection system of claim 4, comprising a controller configured to instruct the compression assembly to compress the air sample after collecting the air sample in the vessel.

6. The refrigerant leak detection system of claim 5, wherein the controller is configured to instruct the compression assembly to compress the air sample in coordination with activating the cooling device to cool the air sample.

7. The refrigerant leak detection system of claim 4, wherein the compression assembly comprises the actuator operatively coupled to the transfer mechanism, and wherein the transfer mechanism comprises a piston in a sealed engagement with the walls of the vessel.

8. The refrigerant leak detection system of claim 7, comprising a controller configured to instruct the compression assembly to compress the air sample by instructing the actuator to actuate the piston to reduce an interior volume of the vessel.

9. The refrigerant leak detection system of claim 1, wherein the vessel comprises:
   a port fluidly coupling an interior of the vessel to a monitored air volume exterior to the vessel; and
   a valve fluidly coupled to the port, wherein the valve is configured to open to enable the air sample to traverse the port and to close to impede the air sample from traversing the port.

10. The refrigerant leak detection system of claim 9, comprising a conduit having a proximal end fluidly coupled to the port and a distal end in fluid communication with the monitored air volume, wherein the conduit comprises the valve.

11. The refrigerant leak detection system of claim 9, comprising a fan as the transfer mechanism, wherein the fan is fluidly coupled to the port.

12. The refrigerant leak detection system of claim 11, comprising a controller configured to instruct the actuator to collect the air sample by activating the fan to draw the air sample into the vessel while the valve is open.

13. The refrigerant leak detection system of claim 1, comprising a desiccant element fluidly coupled to the vessel, wherein the desiccant element is configured to absorb water from the air sample during or after entry into the vessel.

14. The refrigerant leak detection system of claim 13, wherein the desiccant element is integrated into a conduit that fluidly couples the vessel to a monitored air volume.

15. The refrigerant leak detection system of claim 13, comprising a regenerator operatively coupled to the desiccant element and configured to regenerate the desiccant element by heating the desiccant element to release the water absorbed from the air sample.

16. The refrigerant leak detection system of claim 3, comprising a controller configured to activate the cooling device to cool the air sample to an intermediate predefined temperature threshold to condense liquid water from the air sample before activating the cooling device to cool the air sample to the predefined temperature threshold, and wherein the controller is configured to instruct the refrigerant leak detection system to drain the liquid water from the vessel when the liquid water is present in the vessel.

17. The refrigerant leak detection system of claim 1, wherein a sensor including the vessel, the cooling device, the liquid detection device, and the actuator is disposed within a bent portion of a return duct or a supply duct of the HVAC system.

18. The refrigerant leak detection system of claim 1, wherein the transfer mechanism comprises a fan or a shaft coupled to a piston.

19. A heating, ventilation, and air conditioning (HVAC) system, comprising:
   a sensor that includes a vessel having walls, a compression assembly operatively coupled to the vessel and configured to compress an air sample against the walls of the vessel, a cooling device operatively coupled to the walls of the vessel and comprising a cooled surface, and a liquid detection device operatively coupled to a bottom portion of the walls of the vessel and comprising optical circuitry or electrical circuitry; and
   a controller configured to instruct the sensor to collect the air sample in the vessel from a monitored air volume of the HVAC system, instruct the compression assembly to compress the air sample to a predefined pressure threshold, instruct the cooling device to cool the air sample to a predefined temperature threshold via the cooled surface, instruct the liquid detection device to identify whether a condensed refrigerant is present in the vessel via the optical circuitry or the electrical circuitry, and instruct the HVAC system to modify operation when the condensed refrigerant is present in the vessel.

20. The HVAC system of claim 19, wherein the liquid detection device is configured to detect the condensed refrigerant including one or more refrigerants, one or more refrigerant additives, or a combination thereof, that have leaked from a vapor compression system of the HVAC system.

21. The HVAC system of claim 19, wherein the controller is configured to instruct the sensor to compress the air sample while cooling the air sample.

22. The HVAC system of claim 19, wherein the controller is configured to instruct the sensor to compress the air sample before cooling the air sample.

23. The HVAC system of claim 19, wherein the controller is configured to communicatively couple to a HVAC controller of the HVAC system.

24. The HVAC system of claim 19, wherein the liquid detection device is configured to identify that the condensed refrigerant is present in the vessel when any liquid is present in the vessel after cooling the air sample.

25. The HVAC system of claim 19, wherein the liquid detection device comprises the optical circuitry that is configured to measure a refractive index after cooling the air sample, and wherein the liquid detection device is configured to identify that condensed refrigerant is present in the vessel when the refractive index corresponds to the condensed refrigerant.

26. A method of operating a sensor system of a heating, ventilation, and air conditioning (HVAC) system of a building, comprising:
   collecting an air sample in a vessel of the sensor system from a monitored air volume of the HVAC system or the building;
   compressing and cooling the air sample within the vessel; and
   determining whether any condensed refrigerant is present in the vessel.

27. The method of claim 26, comprising modifying operation of the HVAC system when a condensed refrigerant is determined to be present in the vessel.

28. The method of claim 26, wherein compressing and cooling the air sample comprises compressing the air sample to a predefined pressure threshold.

29. The method of claim 26, wherein compressing and cooling the air sample comprises cooling the air sample to a predefined temperature threshold.

30. The method of claim 29, wherein compressing and cooling the air sample comprises cooling the air sample to an intermediate predefined temperature threshold to condense water from the air sample before cooling the air sample to the predefined temperature threshold.

\* \* \* \* \*